Oct. 4, 1966    C. F. LEYSE    3,276,965
SINGLE PASS SUPERHEAT REACTOR
Filed June 17, 1963    6 Sheets-Sheet 2

Carl F. Leyse
INVENTOR.

BY Sidney B. Ring
Hyman Hals

Carl F. Leyse
INVENTOR.

Oct. 4, 1966 C. F. LEYSE 3,276,965
SINGLE PASS SUPERHEAT REACTOR
Filed June 17, 1963 6 Sheets-Sheet 4

Carl F. Leyse
INVENTOR.

BY

Carl F. Leyse
INVENTOR.

Oct. 4, 1966  C. F. LEYSE  3,276,965

SINGLE PASS SUPERHEAT REACTOR

Filed June 17, 1963  6 Sheets-Sheet 6

Carl F. Leyse
INVENTOR

BY Sidney B. Ring
Hyman Hais
ATTORNEY

3,276,965
SINGLE PASS SUPERHEAT REACTOR
Carl F. Leyse, Chesterfield, Mo., assignor to Internuclear Company
Filed June 17, 1963, Ser. No. 288,390
8 Claims. (Cl. 176—22)

This invention relates to an atomic reactor for converting a fluid to a superheated vapor by a single pass of said fluid through the reactor core and to a power plant utilizing such atomic reactor as the energy source.

The specific details of the theory and essential characteristics of nuclear reactors are well known and are set forth in prior art publications including, among others, (1) U.S. Patent No. 2,708,656, issued on May 17, 1955, E. Fermi and L. Szilard, (2) Experimental Production of Divergent Chain Reaction, E. Fermi, American Journal of Physics, vol. 20, No. 9, December 1952, (3) Science and Engineering of Nuclear Power, C. Goodman, Addison-Wesley Press, Inc., Cambridge, Mass., vol. 1 (1947) and vol. 2 (1949), (4) The Elements of Nuclear Reactor Theory, S. Glasstone and M. Edlund, D. Van Nostrand Co., Inc., New York, 1952, (5) Elementary Pile Theory, H. Soodak and E. C. Campbell, John Wiley and Sons, New York, 1950) (6) Current Status of Nuclear Reactor Theory, A. Weinberg, Am. J. of Phys., vol. 20, October 1952, pp. 401–412, (7) Multigroup Methods for Neutron Diffusion Problems, R. Ehrlich and H. Hurwitz, Jr., Nucleonics, vol. 12, No. 2, February 1954, pp. 23–30, and (8) Neutron Cross Section, A.E.C.U.–2040, OTS, Dept. of Commerce.

More particularly, this invention relates to an atomic reactor for converting water to superheated steam by a single pass of the water through the reactor core and to a power plant utilizing such atomic reactor as the energy source.

As is well known, the future widespread use of nuclear or atomic reactor energy sources shall depend on whether such energy sources are competitive with known conventional energy sources. One means for achieving competitive low power cost is the single pass superheat reactor of this invention, and the low power costs attainable with said reactor depend on the combination of the components thereof. The single pass superheat reactor of this invention can be easily and economically constructed and is reliable. The reactor of this invention is such that it is capable of being made portable and of meeting the requirements and objections of a field power station, as follows:

(1) Reduced capital costs
(2) Increase in reliability, transportability and relocatability
(3) Reduced installation effort
(4) Reduced operating crew size
(5) Reduced operating costs.

I have provided here a single pass superheat power reactor which, among other things, is characterized by its relatively small size, high power density, long fuel life, and simplified controls and is preferably portable and meets the requirements and objectives of a field power station.

More specifically, the reactor of this invention is a direct cycle boiling water reactor in which water, preferably light water, is converted to superheated, or high quality, steam in a single pass through the core thereof. The reactor feedwater enters the reactor core container and serves both as the reactor core coolant and moderator. During normal steady-state operation of the reactor, all the water fed to the reactor core emerges therefrom as superheated, or high quality, steam, and the water-steam mixture in the core assumes a density distribution which holds the reactor critical at a power level corresponding to the feedwater flow rate times the enthalpy change of the coolant in passing through the core. While the reactor power level is primarily determined by the reactor feedwater flow rate, it is also dependent upon the feedwater temperature since the exit temperature of the steam and the enthalpy change of the water in passing through the core depend upon the feedwater temperature. Since control of the exit steam temperature over a sufficient range is accomplished by varying the inlet feedwater temperature, preferably by feedwater heaters, the reactor of this invention does not require mechanically operated or controlled control means, although, if desired, control means, for example, mechanically controlled control rods, can be utilized to control the exit steam temperature.

In the reactor of this invention, the highly asymmetric density distribution of the water-steam mixture produces a corresponding asymmetric power distribution. Initially, the power density maximum is near the bottom of the core, the power density decreasing approximately exponentially toward the top of the core. The magnitude of the power peak, the slope of the power distribution in the upper part of the core, and the enthalpy of the exit steam are dependent upon the core materials and core geometry. The combination of the components in the reactor of this invention is such that the desired exit steam conditions are attained.

It has unexpectedly been found that the low flow rates associated with conversion of the feedwater to steam in a single pass through the core of the reactor of this invention and the highly asymmetric power distribution do not limit reactors of this invention to relatively low average power density. Average power densities in excess of those normally achieved in conventional boiling water reactors and comparable to those achieved in pressurized water reactors are attained in the reactors of this invention. For example, with fuel elements of the $UO_2$ type, the primary limitation is the fuel center temperature and not the surface heat transfer and, therefore, use of $UO_2$ fuel normally dictates relatively small diameter fuel rods.

The significant advantage of the highly asymmetric power distribution characteristic of the reactor of this invention is the relatively high utilization of fuel that can be realized. With fuel of uniform enrichment and uniformly distributed throughout the reactor core, the power peaks in the lower portion of the core and, thus, the fuel burnup rate is initially highest in this region. However, in the upper parts of the core where the water density is low, the conversion ratio increases significantly and for some core compositions approaches unity. During continued operation of the reactor of this invention, the fuel is preferentially burned in the lower portion of the core, and the power peak gradually moves up the core. However, the lower portion of the core continues to yield appreciable power until the fuel has been largely depleted. The result is extremely efficient utilization of the fuel when coupled with the relatively high conversion rates achieved in the upper portions of the core where the water density is low. Thus, the reactor of this invention is such that fuel cycle costs are greatly reduced.

In addition to the achievement of low fuel cycle costs, the reactor of this invention and the power plant of this invention are such that the respective capital costs thereof are greatly reduced. Since high capital costs of nuclear power plants presently known are a major deterrent to nuclear power becoming economically feasible in plants of modest size and in geographical areas other than the high cost fuel areas, the lower capital costs of the reactor and of the power plant of this invention are of major significance. The nuclear power plant of this invention and the reactor of this invention have lower capital costs primarily because the nuclear power plant of this invention is a less complex plant than presently known plants utilizing reactors other than the reactor of this invention and the reactor of this invention is likewise less complex than presently known reactors. In the power plant of this invention, since the steam is fed directly from the reactor to the turbine which activates the generator, there is no intermediate heat exchanger such as exists in known reactor systems. Since the feedwater to the reactor is converted to superheated steam in a single pass through the reactor core, there is no large coolant recirculating loop. The elimination of control rods together with the control drives and much of the nuclear control instrumentation normally associated with such systems results in a significant reduction of the capital costs. In addition, the reactor of this invention produces steam at temperatures and pressures consistent with modern turbine technology and, therefore, a high over-all thermal efficiency is realized.

The geometry of the reactor of this invention is such that operation thereof is accomplished without any mechanically operated control means, such as mechanically operated control rods. The core of the reactor is a multi-section, or multi-region, core, and each section, or region, is sub-critical when it is flooded with clean water while the adjacent sections, or regions, are empty of water or flooded with borated water. Contemplated within the scope of this invention and preferred embodiments of the reactor of this invention are reactors having a core divided into annular sections, or regions, and a core divided into sections, or regions, each having the shape of a segment, each of said sections being referred to as a "pie-shaped" section. In the reactor having annular sections the steam emerges from the core vessel at the top portion thereof, and in the reactor having segmented sections the steam is directed downwardly through a steam passage through the center of the core and is directed out of the core vessel at the bottom portion thereof. The latter arrangement has the advantage that it reduces the radial maximum-to-average power, while it has the disadvantage of higher neutron leakage and requires a higher enrichment for the same reactivity.

In each of the preferred embodiments the reactor power level and the exit steam temperature, during normal operation, are controlled by regulating the feedwater flow rate and the feedwater inlet temperature. For normal shutdown, the feedwater flow rate is reduced to a small percentage of its full power flow rate, but always in excess of the flow rate required to remove shutdown heat, so that the reactor remains critical at low power. For complete shutdown necessitated for fuel changing, maintenance, or emergency conditions, a solution of sodium pentaborate, or similar neutron poison solution, is injected into the bottom of the core in order to terminate the chain reaction and permit complete flooding of the core. After performance of the necessary shutdown operations, the neutron poison solution is drained from the core, and the core is flushed with clean water prior to operation. This is accomplished by draining the poison solution and then flushing the core, one region, or section, at a time, until the complete core has been cleaned and drained, and is again ready for operation.

The nuclear reactor power plant includes a turbine-generator plant fed directly with steam from the reactor and is of such construction that on an increase in generator load a turbine throttle valve means opens and system pressure decreases and, conversely, on a decrease in generator load, the system pressure increases. This pressure change is reflected back to a feedwater pump means in the power plant circuit. When the pressure at the pump means outlet decreases, the flow increases and, conversely, when the pressure at the pump means outlet is increased, the flow decreases. The reactor power level is directly proportional to the flow rate, and consequently the plant inherently follows the load demand.

The component materials utilized as the atomic fuel in the core of the reactor of this invention include, as follows:

(1) A fissile atomic fuel material such as $U^{235}$, $Pu^{239}$, $Pu^{241}$, $U^{233}$, and mixtures thereof, among others.

(2) A burnable neutron poison such as boron, cadmium, europium and samarium, among others.

(3) A neutron moderator such as zirconium hydrides, other metal hydrides, and beryllium, among others.

(4) A fertile atomic fuel material such as $U^{238}$ and $Th^{232}$, among others.

Also, the aforementioned fissile atomic fuel material is utilized in the form of the respective oxide. The ratio of components 1 through 4 can vary widely in such a manner that the resulting fuel converts the fluid, such as water, to vapor, such as steam, by a single pass through the reactor core. Other factors, in addition to the fuel, involved in making a single pass conversion to vapor are, for example, the core geometry, the core volume occupied by the atomic fuel, the shape of each of the fuel elements, the inlet rate and temperature of the fluid, and the like. Where these aforementioned factors are kept constant, superheated vapor exit conditions are maintained essentially constant throughout the life of the reactor because of the proper combination of 1 through 4, supra. Furthermore, because of the inclusion of the burnable neutron poison in the reactor core and in the fuel element, the life of the fuel element or reactor element is greatly increased. Likewise, because of the inclusion of the neutron moderator material in the reactor core and in the fuel element the life of the fuel element or reactor element is greatly increased. Likewise, because of the inclusion of the neutron moderator material and the neutron poison, or absorber, material the life of the fuel element or reactor element is greatly increased. With such combination of 1 through 4, reactor power is controlled primarily by feedwater temperature and flow rate.

Thus, it is readily apparent that the range of utilization in the power generation field varies from small portable package power plants to large stationary power plants. The reactor of and the power plant of this invention have greatly utility in the application to compact power plant systems due to the very nature of the reactor itself because of the unique combination of reactor materials.

An object of this invention is to provide a single pass superheat reactor.

Another object of this invention is to provide a single pass superheat reactor having a core including a fissile atomic fuel, a burnable neutron poison, a neutron moderator, and a fertile atomic fuel.

Another object of this invention is to provide a long life single pass superheat reactor for converting water to superheated steam of relatively constant exit enthalpy.

Another object of this invention is to provide a single pass superheat reactor comprising a core including neutron moderated material-containing atomic fuel elements, each fuel element having said neutron moderator material as cladding.

Another object of this invention is to provide a single pass superheat reactor comprising a core including neutron moderated material-containing atomic fuel elements, each fuel element having said neutron moderator material dispersed therethrough.

Another object of this invention is to provide a single pass superheat reactor for achieving maximum utilization of the atomic fuel comprising means for removing from the reactor core the lower fuel elements which are depleted at a faster rate than the upper fuel elements because of lower coolant density at the top portion of the reactor core than at the bottom portion of the reactor core, means for moving top core fuel elements down to replace lower fuel elements, and means for adding fresh fuel elements at the top portion of the reactor core.

Another object of this invention is to provide a single pass superheat reactor which requires no mechanically operated controls such as reflector controls, control rods, and shim safety rods.

Another object of this invention is to provide a single pass superheat reactor having its steam exit at the top portion thereof.

Another object of this invention is to provide a single pass superheat reactor comprising a multi-section core, separate means for passing water through each section of said core, and separate means for passing neutron absorber-containing fluid through each section of said core, whereby each section can be filled and drained independently of the other thereby obviating the requirement for mechanically operated control means and thereby being capable of having one section subcritical when filled with water, and another section filled with borated water, and another section empty of water.

Another object of this invention is to provide a single pass superheat reactor wherein the exit temperature of the steam emitted from the reactor is regulated by controlling the feedwater flow rate and the feedwater temperature.

Another object of this invention is to provide a single pass superheat reactor wherein the exit temperature of the steam emitted from the reactor is regulated by controlling the feedwater flow rate, the feedwater temperature, and the reactor pressure.

Another object is to provide a nuclear reactor power plane comprising a single pass superheat reactor as the energy source, a power output means operatively associated with said reactor and control means including means responsive to the power output for decreasing the reactor pressure on an increase in power output and increasing the reactor pressure on a decrease in power output whereby there results less energy loss from the reactor core.

Other objects and features of this invention will become apparent from the following detailed description of the preferred embodiments of this invention which is merely illustrative and not limiting.

Like numerals designate like components.

Figure 1:
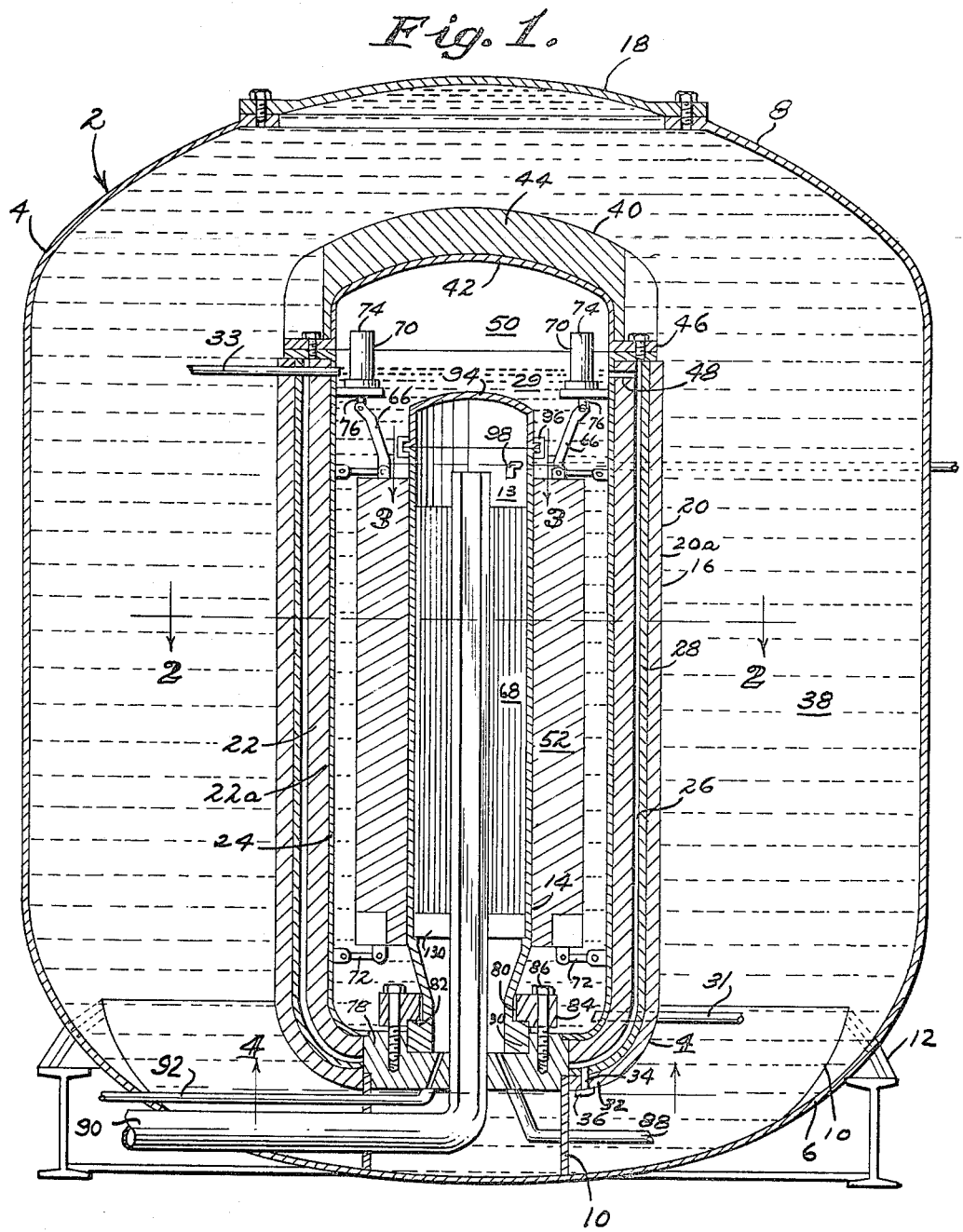
FIGURE 1 is a longitudinal sectional view through one embodiment of the reactor of this invention.
Figure 2:
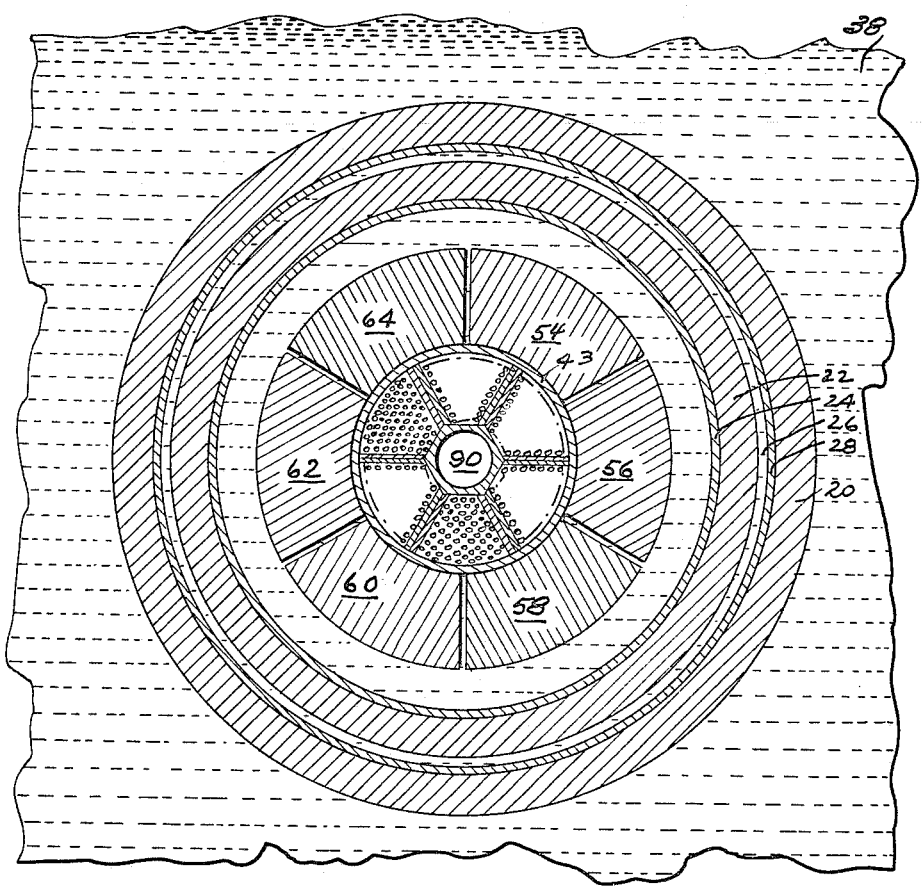
FIGURE 2 is a sectional view taken on line 2—2 of the reactor shown in FIGURE 1.
Figures 3, 4:
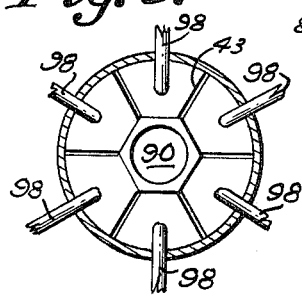
FIGURE 3 is a sectional view taken on line 3—3 of the reactor shown in FIGURE 1.
FIGURE 4 is a sectional view taken on line 4—4 of the reactor shown in FIGURE 1.
Figure 5:
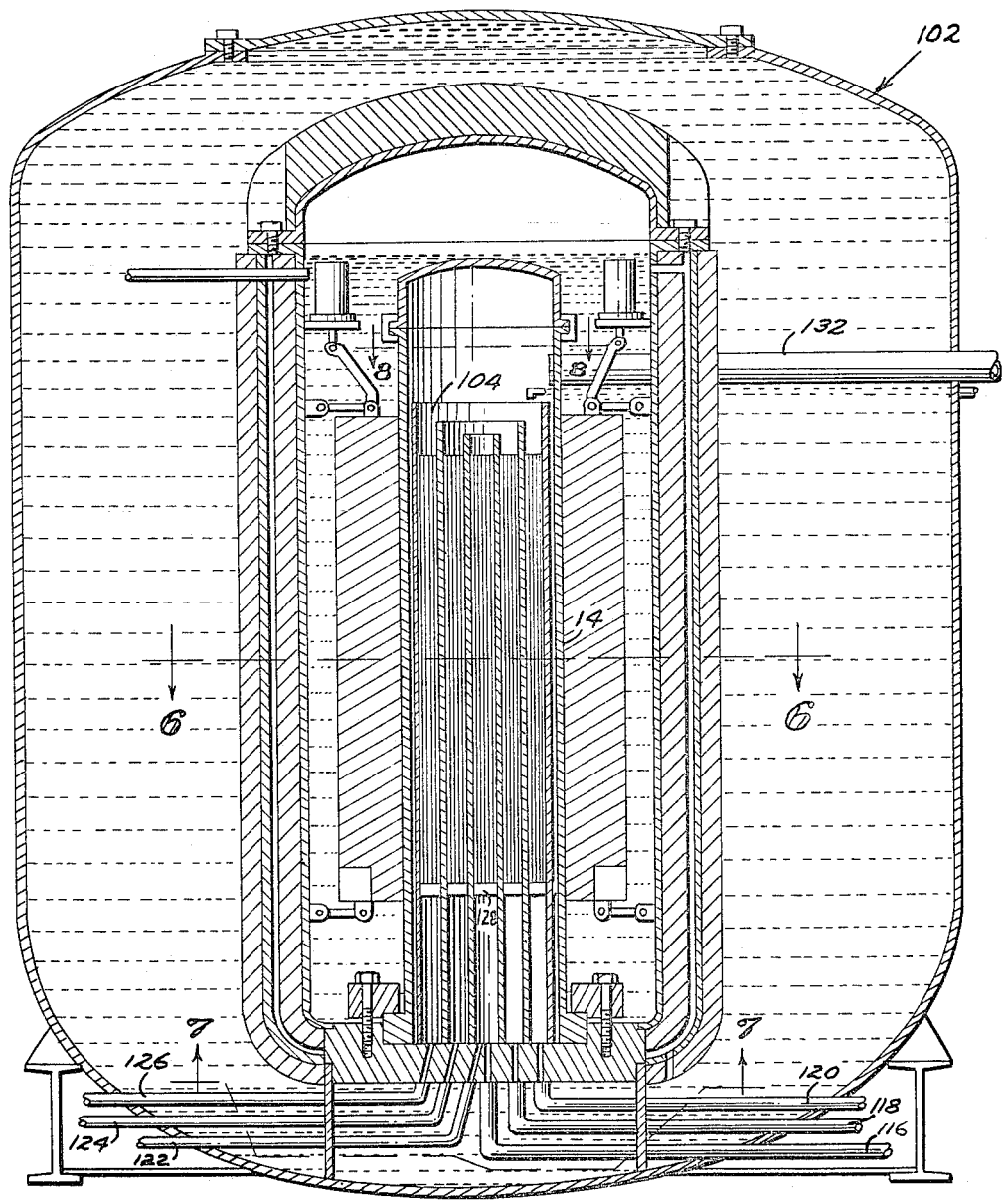
FIGURE 5 is a longitudinal sectional view through another embodiment of the reactor of this invention.
Figure 6:
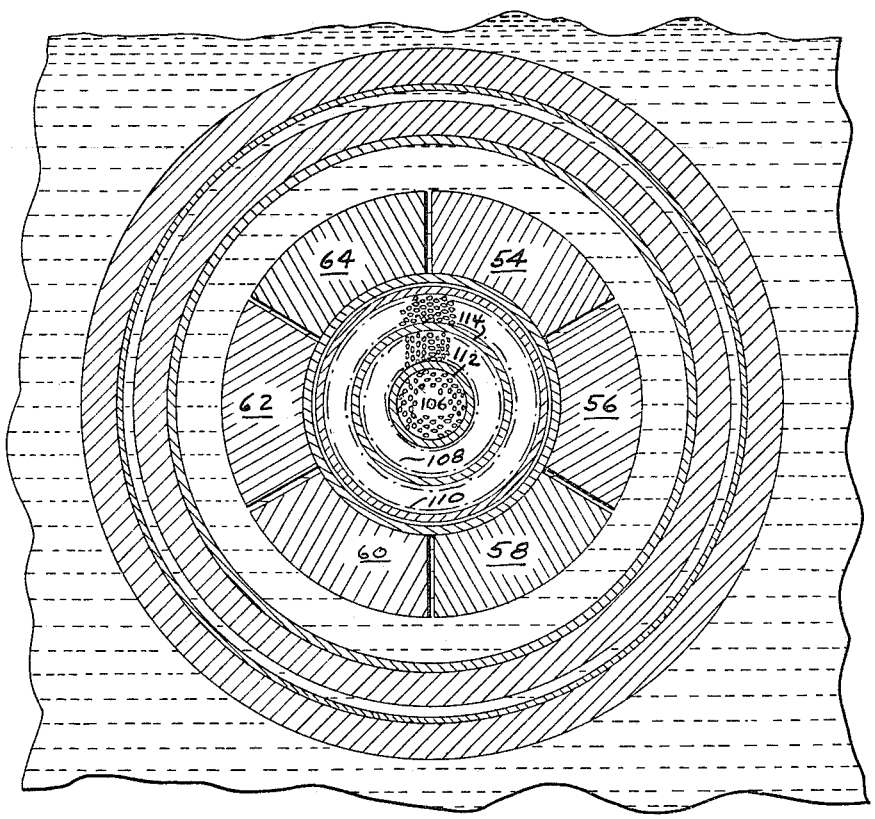
FIGURE 6 is a sectional view taken on line 6—6 of the reactor shown in FIGURE 5.
Figure 7:
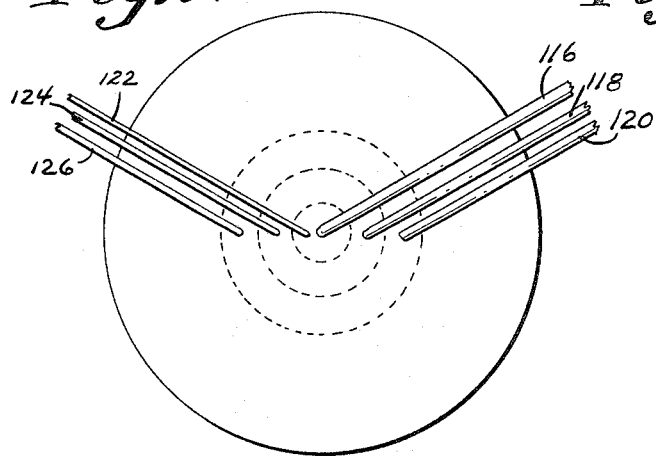
FIGURE 7 is a view taken on line 7—7 of the reactor shown in FIGURE 5.
Figure 8:
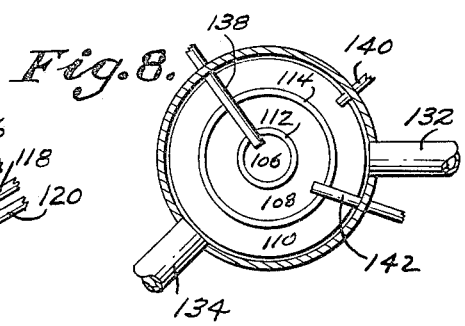
FIGURE 8 is a sectional view taken on line 8—8 of the reactor shown in FIGURE 5.
Figure 11:
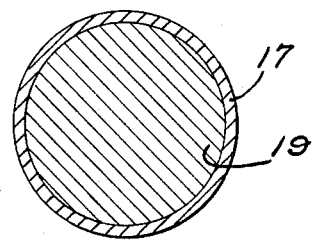

FIGURE 11 is a sectional view through one embodiment of a rod shaped fuel element containing a fissile atomic fuel, a fertile atomic fuel, a neutron moderator material and a burnable neutron poison material dispersed therethrough, said fuel element having a cladding of a material suitable for operation at the temperature and under the conditions existing in the reactor shown in FIGURE 1 and in the reactor shown in FIGURE 5.

Figure 12:
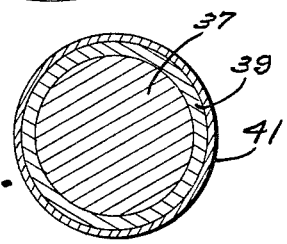

FIGURE 12 is a sectional view through another embodiment of a rod shaped fuel element containing a fissile atomic fuel and a fertile atomic fuel and a burnable neutron poison dispersed therethrough, said fuel element being doubly clad, first with a neutron moderator material and then with a material suitable for operation at the temperature and other conditions existing in the reactor shown in FIGURE 1 and in the reactor shown in FIGURE 5.

Figure 13:
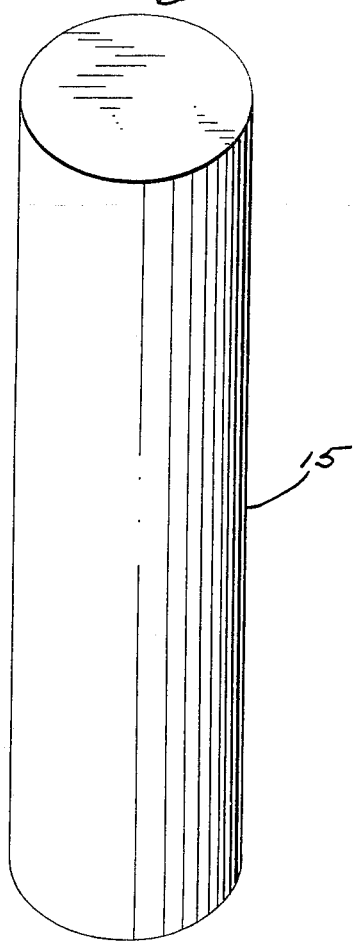

FIGURE 13 is a view in perspective of one embodiment of the fuel element used in the reactor shown in FIGURE 1 and in the reactor shown in FIGURE 5.

Figure 14:
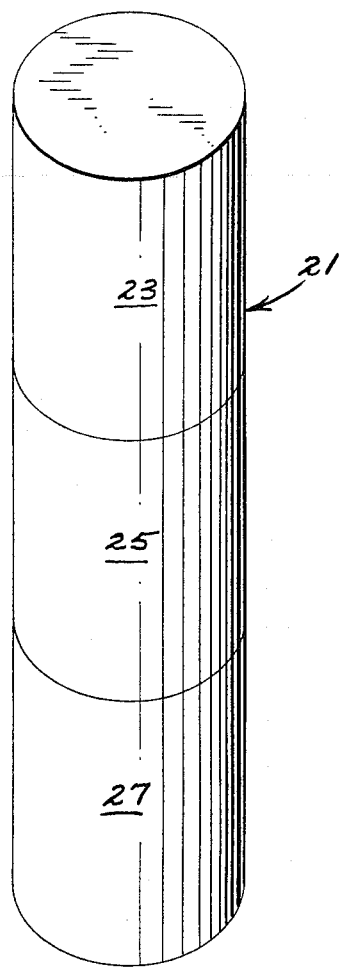

FIGURE 14 is a view in perspective of another embodiment of the fuel element combination used in the reactor in FIGURE 1 and in the reactor shown in FIGURE 5.

More specifically, reactor assembly 2 includes water shield tank 4 having ellipsoidal head 6 on the bottom and hemispherical head 8 on top. Said reactor assembly 2 is mounted on I-beam skids 12 attached to central skirt 10 supporting reactor pressure vessel 14 and shutdown shield 16, thereby causing the weight of shield 16 and reactor vessel assembly 2 to be transmitted to skids 12 and shield tank 4 to be reinforced and amply supported. Access to reactor pressure vessel 14 is provided by means of flanged closure member 18 in top hemispherical head 8 of shield tank 4.

Radial shutdown shield 16 consists of two hollow lead cylinders 20 and 22 bonded to stainless steel shields 24 and 28. Gap 26 between concentric cylinders 20 and 22 provides a cooling channel for shield 16.

Fixed lower flange 30, including mmeber 78, of reactor pressure vessel 14 is welded to bottom shield 32, and shield 32 is welded to skirt support 10 which is in turn welded to head 6 of water shield tank 4. Pressure relief ports 34 having rupture discs 36 are provided through shield 32 to gap between concentric shields 20 and 22 and permit the gradual release of steam, in the unlikely event of reactor pressure vessel rupture, and facilitate condensation of the steam by the borated water 38 in water shield tank 4 thereby effecting pressure suppression.

Top shield 40 consists of stainless steel dished head 42 to which is bonded thick lead member 44. Flanged joint 46 connects head 42 to inner steel cylinder 24 and provides access to reactor pressure vessel 14.

Orificed holes 48 are provided just below flanged joint 46 and connect vapor dome 50 to gap 26 between concentric shield cylinders 20 and 22. In the event of a sudden increase within containment shell 24 or cylinder 24, which would occur in the event of a failure or leak of reactor pressure vessel 14, steam would be expelled through orificed holes 48 into gap or annulus 26 between concentric shield cylinders 20 and 22, and be forced downwardly breaking rupture discs 36 and out of the holes in the bottom of shield 32. The borated water 38 in water shield tank 4 condenses the escaping steam and thereby effects pressure suppression.

Beryllium reflector 52 is in the form of a right hollow cylinder segmented on radial planes and includes segments 54, 56, 58, 60, 62 and 64. Each of said segments 54, 56, 58, 60, 62 and 64 is supported from containment shell 24 by pinned linkages 66, 72 permitting the respective segment to rotate downwardly. As rotation occurs, the respective segment moves laterally away from reactor pressure vessel 14 and core 68. Each segment has a drive unit 70 consisting of a simple hydraulic-pneumatic system (not shown) which actuates a piston (not shown) in cylinder 74. Pinned connecting rod 76 transmits piston motion to the respective reflector segment through respective linkage 66.

Lower end portion 80 of reactor pressure vessel 14 is provided with a faced lap 82 and mates with and is centered by fixed flange 30 which is part of reactor vessel 14 support structure. Lug clamps 84 and studs 86 are provided on fixed flange 30 thereby making a ring joint and attaching reactor pressure vessel 14 to the support structure including skirt 10. Inlet feed water pipes 88, superheated steam outlet pipe 90, and liquid poison injection pipes 92 penetrate through member 78 of fixed flange 30 of reactor pressure vessel 14. Thusly, reactor pressure vessel 14 can be removed after loosening lug clamps 84. The upper portion of reactor pressure vessel 14 is provided with flanged closure member 94 fitted thereto by means of squeeze-fit clamp ring 96. Clean-up flow inlet pipes 98 penetrate reactor vessel 14.

Reactor core 68 has fixed fuel assemblies 1, 3, 5, 7, 9 and 11 arranged in annulus 13 between the outside surface of steam outlet pipe 90 and the inside surface reactor pressure vessel 14. As is readily apparent in the appended drawings, the contour of the outside surface of steam outlet pipe 90 is of hexagonal cross section. Each fuel assembly consists of a plurality of rod shaped fuel elements 15 having Inconel tubular cladding 17 and containing a mixture 19 of fully enriched fissile atomic fuel, such as $UO_2$, and moderator material, such as $ZrH_{1.7}$. Said fuel rods 15 are assembled on a triangular pitch with a center to center rod spacing, as clearly shown in the appended drawings. Instead of a unitary rod shaped fuel element, a composite rod shaped fuel element 21 having, for example, three shorter rod shaped members 23, 25 and 27 can be used in order to enable the easy replacement of portions of the fuel element without the necessity of removing the entire fuel element thereby achieving maximum utilization of the atomic fuel by removing the portion of the fuel element depleted at a faster rate. Within shell 24 is borated water coolant 29 passing therethrough by forced convection entering shell 24 through inlet pipe 31 and leaving through outlet pipe 33. Between each core segment are segment dividers 43.

The fuel bearing material 19 contains fully enriched fissile atomic fuel such as $UO_2$, burnable neutron poison such has CdO, neutron moderator material such as $ZrH_{1.7}$ or beryllium, and fertile atomic fuel such as $U^{233}$. For example, material or fuel core 19 is a $UO_2$-$ZrH_{1.7}$-CdO dispersion having an Inconel cladding 17.

Also contemplated to be within the scope of this invention is rod shaped fuel element having fuel bearing material 37 containing fully enriched fissile atomic fuel such as $UO_2$ and burnable neutron poison as CdO without any neutron moderator or with a small amount of neutron moderator, said material 37 having a cladding of neutron moderator material 39 such as beryllium or $ZrH_{1.7}$ and then an Inconel cladding 41.

Figure 9:
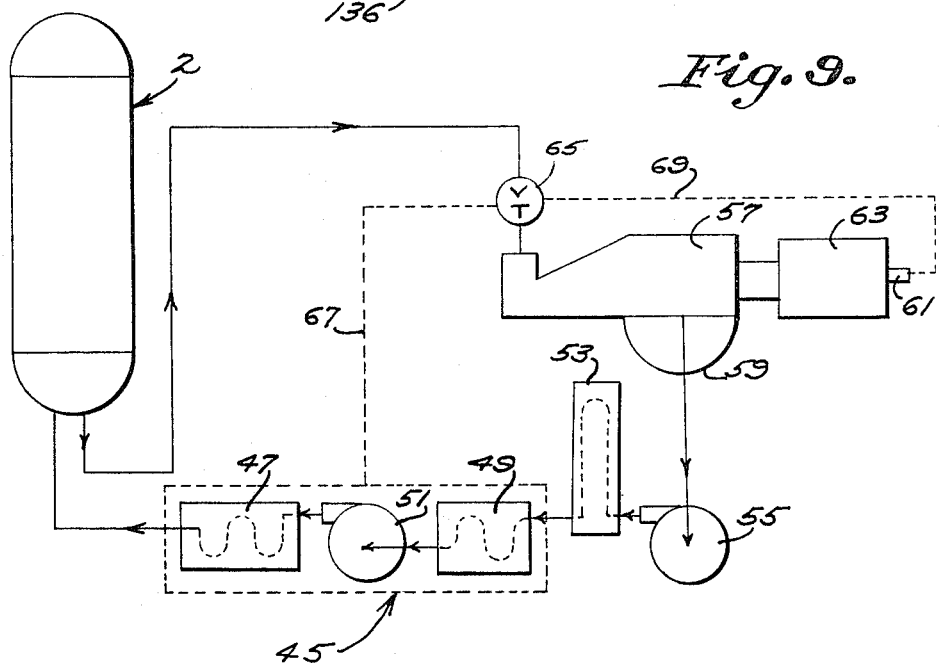
FIGURE 9 is a flow diagram of a nuclear power plant wherein the reactor shown in FIGURE 1 is utilized.

Nuclear power plant 45, referring to FIGURE 9, includes reactor assembly 2, feedwater heaters 47, 49, feedwater pumps 51, coolant purification member 53, condensate pumps 55, turbine-generator set 57 having condenser 59, and means responsive to the power output of turbine generator 57 for decreasing the reactor pressure on an increase in power output and increasing the reactor pressure on a decrease in power output, said means including throttle valve means 65 operatively connected to generator shaft 61 and to pumping means 51 and to feedwater heaters 47 and 49. On an increase in the generator 63 load, throttle valve means 65 opens and senses pumping means 51 to increase the feedwater flow and to control feedwater temperature and system pressure decreases. Conversely, on a decrease in generator 63 load, throttle valve means closes and senses pumping means 51 to decrease feedwater flow and to control feedwater temperature and system pressure increases. Dotted lines 67 and 69 merely show diagrammatically the sensing means from throttle valve means 65 to generator shaft 61 and to the combination of pumping means 51 and feedwater heaters 47 and 49.

Data for a 500 KWE Portable nuclear power plant shown in FIGURE 9 including the reactor assembly 2 shown in FIGURE 1 are summarized in Table 1, as follows:

*Table 1.—Plant design characteristics*

I. Plant Data:
  Gross electrical output, kwe _____ 526
  Net electrical output, kwe _____ 495
  Steam flow, lb./hr. _____ 12,300
  Reactor power, mwt _____ 3.63
  Reactor exit steam temperature, °F. ___ 667
  Reactor feedwater temperature, °F. ___ 290
  Reactor pressure, p.s.i.a. _____ 1,200
  Turbine exhaust pressure, p.s.i.a. _____ 55
  Design ambient temperature, °F. _____ 120
  Design elevation (above sea level), ft. __ 3,500
  Net plant thermal efficiency, percent ___ 13.7
  Total dry plant weight, lbs. _____ 29,500
  Reactor and power conversion module weight, lbs. _____ 25,000
  Control console module weight, lbs. ____ 4,500

II. Reactor core:
  A. Fuel
    Enrichment, percent _____ 93.5
    Amount in core, initial, kg. U _____ 36.0
    Amount in core, end of core life, kg. U _____ 25.6
    Burnup, mwd _____ 7,000
  B. Fuel rods
    Fuel bearing material, $UO_2$-$ZrH_{1.7}$
    Uranium concentration, wt. percent __ 38
    Clad material, Inconel
    Burnable poison, Cd
    Poison loading, kg. Cd _____ 3.0
    Fuel length, in. _____ 18.0
    Fuel diameter, in. _____ 0.21
    Clad thickness, in. _____ 0.02
    Fuel rod O.D., in. _____ 0.25
  C. Core
    Core shape, Hexagonal cylinder
    Number of fuel rods _____ 876
    Core O.D., in. _____ 10.0
    Core I.D., in. _____ 1.75
    Ratio fuel element volume/core volume _____ 0.60
    Ratio fuel element clad volume/core volume _____ 0.177
    Ratio fuel bearing material volume/core volume _____ 0.423
    Ratio flow volume/core volume _____ 0.40

III. Reactor vessel:
  Material, AM-350
  I.D., in. _____ 100.
  Wall thickness, in. _____ 4.375
  Over-all length, in. _____ 42.0

IV. Reflector:
  Material, Be
  I.D., in. _____ 11.5
  Thickness, in. _____ 4.25
  Length, in. _____ 24

V. Core flow and heat transfer:
  Total flow, lb./hr. _____ 12,300
  Flow area, ft.$^2$ _____ 0.195
  Core inlet temperature, °F. _____ 287
  Water inlet velocity, ft./sec. _____ 0.31
  Steam exit temperature, °F. _____ 667
  Steam exit velocity, ft./sec. _____ 6.25
  Power per unit cross-sectional area of core, mw/ft.$^2$ _____ 7.45
  Power per unit flow area, mw./ft.$^2$ ____ 18.6
  Core volume, ft.$^3$ _____ 0.731
  Power per unit volume, mw./ft.$^3$ _____ 4.29
  Power per unit volume, kw./liter _____ 152
  Heat transfer area, ft.$^2$ _____ 86
  Average heat flux, B.t.u./hr. ft.$^2$ _____ 144,000
  Maximum heat flux, B.t.u./hr. ft.$^2$ _____ 330,000
  Maximum fuel rod surface temperature, °F. _____ 1250
  Maximum fuel rod temperature, °F. ___ 1300

VI. Turbine:
  Inlet temperature, °F. _____ 667
  Inlet pressure, p.s.i.a. _____ 1200

| | |
|---|---|
| Throttle flow, lb./hr. | 12,300 |
| Exhaust pressure, p.s.i.a. | 55 |
| Stages, 3 partial admission impulse, 5 full admission reaction | |
| Estimated efficiency, percent | 68 |
| Speed, r.p.m. | 24,000 |
| Weight, lbs. | 220 |
| Materials: | |
|   Rotor, Inconel | |
|   Stator, 300 series corrosion resistant steel | |
|   Castings, 300 series corrosion resistant steel | |
|   Rotor blades, Inconel with stellite erosion guards | |

VII. Generator:

| | |
|---|---|
| Frequency, c.p.s. | 400 |
| Voltage, volts | 400 |
| Phases, three | |
| Type, homopolar inductor | |
| Estimated efficiency, percent | 90 |
| Weight, lbs. | 800 |
| Materials: | |
|   Rotor, AISI 4340 steel | |
|   Stator laminations, 3.5 percent silicon iron (Armco Tran Cor 7) | |
|   Windings, copper, insulated with type ML insulation | |
|   Insulation, slot liners and phase separators—mica stator encapsulated with epoxy | |
|   Cooling, water cooled stator | |
| Bearings: | |
|   Type, full floating sleeve hydrodynamic journal bearings, tapered land hydrodynamic double acting thrust bearing | |
|   Flow, g.p.m. | 3 |
|   Materials, Materials including Cermets (titanium carbide, tungsten carbide), Stellite-3, monel and 400 series stainless | |

VIII. Pumps:

A. Boiler feed pump

| | |
|---|---|
| Type, two state centrifugal driven by turbine shaft | |
| Estimated efficiency, percent | 38 |
| Flow, lb./hr. | 12,300 |
| Speed, r.p.m. | 24,000 |
| Inlet pressure, p.s.i.a. | 100 |
| Exit pressure, p.s.i.a. | 1250 |
| Inlet temperature, °F. | 215 |
| Shaft power required, kw | 33 |
| Materials: | |
|   Casings and volutes, 300 series stainless steel | |
|   Impellers, Inconel | |
| Weight, lbs. | 50 |

B. Condensate pump

| | |
|---|---|
| Pump | |
|   Type, centrifugal-canned electric motor driven | |
|   Estimated pump efficiency, percent | 60 |
|   Flow, lb./min. | 13,700 |
|   Speed, r.p.m. | 3433 |
|   Inlet pressure, p.s.i.a. | 50 |
|   Exit pressure, p.s.i.a. | 110 |
|   Inlet temperature, °F. | 275 |
|   Suction specific speed, r.p.m. | 7800 |
|   Shaft power required, kw | 1.2 |
|   Weight, lbs. | 100 |
|   Materials, 300 series stainless steel and Inconel | |
| Motor: | |
|   Type, canned stator and rotor induction motor | |
|     Poles | 14 |
|     Speed, r.p.m. | 3433 |
|     Voltage, volts | 440 |
|     Frequency, c.p.s. | 400 |
|     Estimated efficiency, percent | 60 |

IX. Condenser system:

A. Condenser Core

| | |
|---|---|
| Type, tube and fin air cooled (cross flow) | |
| Capacity, B.t.u./hr. | 10,500,000 |
| Inlet air temperature, °F. | 120 |
| Inlet air pressure, p.s.i.a. | 13 |
| Temperature rise, °F. | 85 |
| Pressure (air side), p.s.i. | 0.04 |
| Inlet steam pressure, p.s.i.a. | 55 |
| Pressure drop (steam), p.s.i. | 5 |
| Condensate temperature, °F. | 275 |
| Condenser frontal area, ft.$^2$ | 120 |
| Core width, in. | 3.4 |
| Weight (including headers), lb. | 3000 |
| Material, 300 series stainless steel | |
| No. of tube rows | 5 |
| Tube O.D., in. | 0.38 |
| Tube I.D., in. | 0.32 |
| Fin O.D., in. | 0.92 |

B. Shield water core

| | |
|---|---|
| Type, tube and fin (5 pass-cross flow air) | |
| Capacity, B.t.u./hr. | 1,200,000 |
| Inlet air temperature, °F. | 120 |
| Air temperature rise, °F. | 40 |
| Pressure drop air side, p.s.i. | 0.04 |
| Pressure drop water side, p.s.i. | 5 |
| Water flow, g.p.m. | 22 |
| Core frontal area, ft.$^2$ | 24 |
| Weight (including headers), lbs. | 600 |
| Material, stainless steel (300 series) | |
| Core width, in. | 3.4 |

C. Condenser blowers

| | |
|---|---|
| Type, axial flow (variable pitch stator) | |
| Flow, c.f.m. (each) | 29,700 |
| Fan O.D., ft. | 2.0 |
| Fan I.D., ft. | 1.2 |
| Speed, r.p.m. | 1800 |
| Power, hp. (each) | 6.7 |
| Pressure rise, p.s.i. | 0.05 |
| Electric motor, 7.5 hp., 60 cycle, 440 volt, three phase 1800 r.p.m. (synchronous) | |
| Weight (fan, shroud and motor), lbs. (each) | 200 |

In such 500 KWE nuclear power plant water shield tank 4 is 8½ feet in diameter and 8½ feet overall height. Said tank 4 is made of ¼β thick AM–355 age hardenable stainless steel providing a high strength-weight ratio, and withstands a pressure of 150 p.s.i.g.

Radial shutdown shield 16, as previously set forth, consists of two concentric hollow cylinders 20 and 22. Outer cylinder 20 is 15.50" inside radius followed by 0.375" thick stainless steel 28 and 2.875" lead 20a. Inner cylinder 22 is 12.00" inside radius followed by 0.375" thick stainless steel shell 24 and 2.5" of lead 22a. Gap 26 is 0.25". Top shield 40 consists of stainless steel dished head 42 bonded to 3" thick lead member 44. Top shield 40 and flanged joint 46 withstands a pressure of 60 p.s.i.g. as does stainless steel cylinder 24.

Each of beryllium reflector segments 54, 57, 58, 60, 62 and 64 is 4¼ in. thick.

Reactor pressure vessel 14 is 10" inside diameter, ⅜" wall thickness and approximately 3½ feet overall height. Reactor vessel 14 is preferably of AM–355 which is an age hardenable stainless steel possessing good weldability, excellent corrosion persistance, good machinability and excellent high temperature strengths. AM-350 can also be used and is likewise such a stainless steel but radiation will damage such AM-350 stainless.

Each fuel assembly 1, 3, 5, 7, 9 and 11 of reactor core 68 consists of 146 rod-shaped fuel elements 15, each having Inconel tube cladding 17 containing a mixture of fully enriched $UO_2$ and $ZrH_{1.7}$, the neutron poison cadmium-containing material being dispersed therethrough. Fuel rods 15 are assembled on a triangular pitch with a center to center rod spacing of 0.307 inch.

Fuel loading is determined to be approximately 36 kg. of uranium (93.5% enriched), with sufficient cadmium poison to give a cutoff water density of 0.2 gm./cc. ($K_{eff}=1.00$ at $\rho H_2O=0.2$ g./cc.). The feed water enters the bottom of the core 68 at an enthalpy of 256 B.t.u./lb. and exits at an average enthalpy of 1285 B.t.u./lb.

Core 68 has suficient reactivity for at least 7000 mwd. operation while producing 100° F. superheated steam. Thus, at a 50% load factor, the reactivity life of core 68 is longer than the expected ten-year plant life and no field refueling is required. The average fuel burnup at 7000 mwd. is 72.3 wt. percent while the maximum burnup is nearly 50 wt. percent. The maximum burnup represents about 3% of the atoms in the fuel matrix.

The exit enthalpy of core 68 is maintained constant by beryllium reflector shim control. No more than 0.5% $\Delta k$ control is required to maintain the exit steam enthalpy constant as the fuel burns up the core. This control in effect changes the "cut-off water density" which alters the power distribution slightly and changes exit enthalpy.

Reactor assembly 2 can be flooded and completely shut down by moving the radial beryllium reflector 52 outward from the core. A 2 in. outward movement of reflector 52 in borated water (0.025 gms. $H_3BO_3$/cc.) is worth at least 10% $\Delta k$. The total reactivity control required is less than 7% $\Delta k$, with water of density 1.0 gm./cc. With the reflector divided into six sections, any one section can stick next to the core and the reactor will be shut down by more than 1% $k$.

Data for a 1,500 KWE portable nuclear power plant shown in FIGURE 9 including the reactor assembly 2 shown in FIGURE 1 are summarized in Table 2, as follows:

*Table 2*

I. Plant data:
| | |
|---|---|
| Gross electrical output, kwe | 1,500 |
| Net electrical output, kwe | 1,320 |
| Steam flow, lb./hr. | 22,200 |
| Reactor power, mwt | 6.9 |
| Reactor exit steam temperature, ° F. | 667 |
| Reactor feedwater temperature, ° F. | 310 |
| Reactor pressure, p.s.i.a. | 1,200 |
| Turbine exhaust pressure, p.s.i.a. | 25 |
| Design ambient temperature, ° F. | 120 |
| Design elevation (above sea level), ft. | 3,500 |
| Net thermal efficiency, percent | 19.1 |
| Total dry plant weight, lb. | 50,100 |
| Reactor and power conversion module weight, lb. | 29,800 |
| Heat rejection module weight, lb. | 10,800 |
| Control module weight, lb. | 9,500 |

II. Reactor core:
  A. Fuel
| | |
|---|---|
| Enrichment, percent | 93.54 |
| Initial U in core, kg. | 71.37 |
| End of core life U in core, kg. | 49.77 |
| Burnup, mwd | 15,000 |

B. Fuel rods
| | |
|---|---|
| Fuel bearing material, $ZrH_{1.7}$ | |
| Uranium concentration, wt percent | ~35 |
| Clad material, Inconel | |
| Burnable poison, cadmium | |
| Cd poison loading, kg. | 6.7 |
| Fuel length, in. | 36 |
| Fuel diameter, in. | 0.210 |
| Clad thickness, in. | 0.020 |
| Fuel rod O.D., in. | 0.250 |

C. Core
| | |
|---|---|
| Core shape, hexagonal cylinder | |
| Number of fuel rods | 950 |
| Core O.D., in. | 10 |
| Core I.D., in. | 3 |
| Ratio fuel element volume/core volume | 0.67 |
| Ratio fuel element clad volume/core volume | 0.197 |
| Ratio fuel bearing material volume/core volume | 0.473 |
| Ratio flow volume/core volume | 0.33 |

III. Reactor vessel:
| | |
|---|---|
| Material | Am-350 |
| I.D., in. | 10 |
| Wall thickness, in. | 0.375 |
| Over-all length, in. | 63 |

IV. Reflector—radial:
| | |
|---|---|
| Material, beryllium | |
| I.D., in. | 11.5 |
| Thickness, in. | 4.25 |
| Length, in. | 43 |

V. Core flow and heat transfer:
| | |
|---|---|
| Total flow, lb./hr. | 22,200 |
| Flow area, ft.$^2$ | 0.161 |
| Core inlet temperature, ° F. | 310 |
| Water inlet velocity, ft./sec. | 0.63 |
| Steam exit temperature, ° F. | 667 |
| Steam exit velocity, ft./sec. | 12.6 |
| Power per unit cross-sectional area of core, mw./ft.$^2$ | 14.6 |
| Power per unit flow area, mw./ft.$^2$ | 43.8 |
| Core volume, ft.$^3$ | 1.46 |
| Power per unit volume, mw./ft.$^3$ | 4.72 |
| Power per unit volume, kw./liter | 167 |
| Heat transfer area, ft.$^2$ | 188 |
| Average heat flux, B.t.u./hr.-ft.$^2$ | 125,000 |
| Maximum heat flux (initial), B.t.u./hr.-ft.$^2$ | 360,000 |
| Maximum fuel rod surface temperature, ° F. | 900 |
| Maximum fuel rod temperature, ° F. | 975 |

VI. Turbine:
| | |
|---|---|
| Inlet temperature, ° F. | 667 |
| Inlet pressure, p.s.i.a. | 1,200 |
| Throttle flow, lb./hr. | 22,200 |
| Exhaust pressure, p.s.i.a. | 25 |
| Stages, three partial admission impulse five full admission reaction | |
| Estimated efficiency, percent | 71.5 |
| Speed, r.p.m. | 12,000 |
| Weight, lb. | 900 |

VII. Generator
| | |
|---|---|
| Frequency, c.p.s. | 400 |
| Voltage, volts | 440 |
| Phases, three | |
| Type, homopolar inductor | |
| Estimated efficiency, percent | 92 |
| Weight, lb. | 2,400 |

VIII. Pumps:
  A. Boiler Feed Pump
     Type, two-stage centrifugal driven by turbine shaft
| | |
|---|---|
| Estimated efficiency, percent | 38 |
| Flow, lb./hr. | 22,200 |
| Speed, r.p.m. | 12,000 |
| Inlet pressure, p.s.i.a. | 100 |
| Exit pressure, p.s.i.a. | 1,250 |
| Inlet temperature, ° F. | 215 |
| Shaft power required, kw. | 62 |

Materials:
       Casing and volutes, 300 series stainless steel

| | |
|---|---|
| Impellers, Inconel | |
| Weight, lb. | 150 |
| B. Condensate pump | |
| Type, centrifugal-canned electrical motor driven | |
| Estimated pump efficiency, percent | 64 |
| Flow, lb./hr. | 24,420 |
| Speed, r.p.m. | 3,433 |
| Inlet pressure, p.s.i.a. | 25 |
| Exit pressure, p.s.i.a. | 100 |
| Inlet temperature, °F. | 190 |
| Suction specific speed, r.p.m. | 7,800 |
| Shaft power required, kw. | 2.5 |
| Weight, lb. | 200 |
| Materials, 300 series stainless steel and Inconel | |
| Motor | |
| Type, canned stator and rotor induction motor | |
| Poles | 14 |
| Speed, r.p.m. | 3,433 |
| Glycol pump | |
| Type, centrifugal | |
| Weight, lb. | 250 |
| IX. Condenser system: | |
| A. Condenser core | |
| Type, shell and tube glycol cooled | |
| Capacity, B.t.u./hr. | 20,000,000 |
| Inlet glycol temperature, °F. | 190 |
| Material, 300 series stainless steel | |
| Weight | 2,400 |
| B. Air cooler | |
| Type, tube and fin air cooled (3–500 kwe. units) | |
| Capacity, B.t.u./hr. | 24,000,000 |
| Material, aluminum | |
| Weight, lb. | 3,000 |
| C. Shield water core | |
| Type, tube and fin air cooled (3–500 kwe. units) | |
| Capacity, B.t.u./hr. | 3,000,000 |
| Material, aluminum | |
| Weight, lb. | 600 |
| D. Air blowers | |
| Type, axial flow (3–500 kwe. units) | |

Reactor assembly 102 differs materially from reactor assembly 2 with respect to the core geometry and in the steam exit means. Core 104 is divided into three annular sections, or regions, 106, 108, and 110 separated by core divider cylinders 112 and 114. Each core region has its respective feedwater inlet means 116, 118 and 120 and its respective liquid poison injection pipes 122, 124 and 126. Core 104 is supported on core support grid 128, core 68 of reactor assembly 2 being supported on core support grid 130. Steam formed within reactor pressure vessel 14 emerges through exit pipes 132 and 134 at the top thereof. The other component parts of reactor assembly 102 are substantially the same as those in reactor assembly 2 differing materially therefrom with respect to the dimensions and amounts only. Also, the core regions 106, 108 and 110 have clean-up flow lines 138, 140 and 142, respectively.

The reactor assembly 2 is referred to as a "segmented reactor," while reactor assembly 102 is referred to as a "radially divided reactor."

Figure 10:
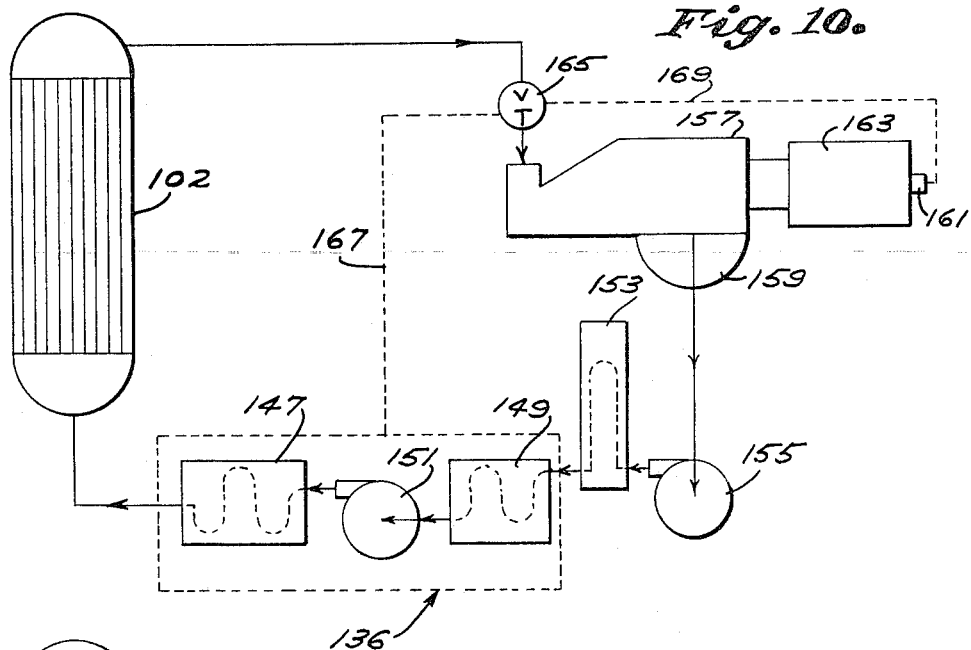
FIGURE 10 is a flow diagram of a nuclear power plant wherein the nuclear reactor shown in FIGURE 5 is utilized.

Nuclear power plant 136, referring to FIGURE 10, includes reactor assembly 102, feedwater heaters 147, 149, feedwater pumps 151, coolant purification member 153, condensate pumps 155, turbine-generator set 157 having condenser 159, and means responsive to the power output of turbine-generator 157 for decreasing the reactor pressure on an increase in power output and increasing the reactor pressure on a decrease in power output, said means including throttle valve means 165 operatively connected to generator shaft 161 and to pumping means 151 and to feedwater heaters 147 and 149. On an increase in the generator 163 load, throttle valve means 165 opens and senses pumping means 151 to increase the feedwater flow and to control feedwater temperature and system pressure decreases. Conversely, on a decrease in generator 163 load, throttle valve means closes and senses pumping means 151 to decrease feedwater flow and to control feedwater temperature and system pressure increases. Dotted lines 167 and 169 merely show diagrammatically the sensing means from throttle valve means 165 to generator shaft 161 and to the combination of pumping means 151 and feedwater heaters 147 and 149.

Beryllium reflector 52, including segments 54, 56, 58, 60, 62 and 64 may be omitted from the reactor assembly 2, the data in Tables 1 and 2 being for a reactor assembly having said reflector 52 omitted therefrom.

Many alterations and changes may be made without departing from the spirit and scope of this invention which is set forth in the appended claims which are to be construed as broadly as possible in view of the prior art.

I claim:

1. A direct cycle boiling fluid reactor for converting fluid to superheated vapor in a single pass therethrough, comprising in combination, a multi-section reactor core region, said reactor core region including fissile atomic fuel material of uniform enrichment, said fissile atomic fuel material being uniformly distributed throughout said reactor core region, including each section thereof, means for passing fluid through said core region and means for simultaneously controlling the fluid feed flow rate and the fluid feed temperature, whereby the exit temperature of the emitted vapor is regulated and the fluid is converted to superheated vapor of relatively constant exit enthalpy, and separate means for passing fluid through each section of said core region and separate means for passing neutron absorber-containing fluid through each section of said core region, whereby each section can be filled and drained independently of the other thereby obviating the requirement for mechanically operated control means.

2. The reactor of claim 1 wherein each section of said core region comprises a burnable neutron poison material, a neutron moderator material, and a fertile atomic fuel material.

3. A direct cycle boiling water reactor for converting water to superheated steam in a single pass therethrough, comprising, in combination, a multi-section reactor core region, said reactor core region including fissile atomic fuel material of uniform enrichment, said fissile atomic fuel material being uniformly distributed throughout said reactor core region, including each section thereof, means for passing water through said core region, means for simultaneously controlling the feedwater flow rate and the feedwater temperature, whereby the exit temperature of the emitted steam is regulated and the water is converted to superheated steam of relatively constant enthalpy, and separate means for passing water through each section of said core region and separate means for passing neutron absorber-containing fluid through each section of said core region, whereby each section can be filled and drained independently of the other thereby obviating the requirement for mechanically operated control means.

4. The reactor of claim 3 wherein each section of said core region comprises a burnable neutron poison material, a neutron moderator material, and a fertile atomic fuel material.

5. A direct cycle boiling fluid reactor for converting fluid to superheated vapor in a single pass therethrough, comprising, in combination, a multi-section reactor core region, said reactor core region including fissile atomic fuel material of uniform enrichment, said fissile atomic fuel material being uniformly distributed throughout said reactor core region, including each section thereof, means for passing fluid through said core region, means for simultaneously controlling the fluid feed flow rate, the fluid feed temperature and the reactor pressure, whereby the exit temperature of the emitted vapor is regulated and the fluid is converted to superheated vapor of relatively constant exit enthalpy, and separate means for passing fluid through each section of said core region and separate means for passing neutron absorber-containing fluid through each section of said core region, whereby each section can be filled and drained independently of the other thereby obviating the requirement for mechanically operated control means.

6. The reactor of claim 5 wherein each section of said core region comprises a burnable neutron poison material, and a neutron moderator material, and a fertile atomic fuel material.

7. A direct cycle boiling water reactor for converting water to superheated steam in a single pass therethrough, comprising, in combination, a multi-section reactor core region, said reactor core region including fissile atomic fuel material of uniform enrichment, said fissile atomic fuel material being uniformly distributed throughout said reactor core region, including each section thereof, means for passing water through said core region, means for simultaneously controlling the feedwater flow rate, the fluid feed temperature and the reactor pressure whereby the exit temperature of the emitted steam is regulated and the water is converted to superheated steam of relatively constant exit enthalpy, and separate means for passing water through each section of said core region and separate means for passing neutron absorber-containing fluid through each section of said core region, whereby each section can be filled and drained independently of the other thereby obviating the requirements for mechanically operated control means.

8. The reactor of claim 7 wherein each section of said core region comprises a burnable neutron poison material, a neutron moderator material, and a fertile atomic fuel material.

References Cited by the Examiner

UNITED STATES PATENTS

| | | | |
|---|---|---|---|
| 3,034,977 | 5/1962 | Hall et al. | 176—54 |
| 3,049,487 | 8/1962 | Harrer et al. | 176—54 |
| 3,098,812 | 7/1963 | Treshow | 176—56 |
| 3,122,484 | 2/1964 | Iskevderian | 176—93 |
| 3,144,393 | 8/1964 | Rober et al. | 176—54 |
| 3,175,955 | 3/1965 | Cheverton | 176—93 |

FOREIGN PATENTS

| | | |
|---|---|---|
| 592,205 | 2/1960 | Canada. |
| 701,192 | 1/1965 | Canada. |
| 1,279,117 | 11/1961 | France. |

OTHER REFERENCES

Lenz (German application No. 1,039,659), printed September 25, 1958.

L. DEWAYNE RUTLEDGE, *Primary Examiner.*

REUBEN EPSTEIN, CARL D. QUARFORTH,
*Examiners.*

M. R. DINNIN, H. E. BEHREND, *Assistant Examiners.*